(12) United States Patent
Hoeflinger

(10) Patent No.: US 10,527,188 B2
(45) Date of Patent: Jan. 7, 2020

(54) GAS VALVE AND METHOD FOR ACTUATION THEREOF

(71) Applicant: TRUMA GERAETETECHNIK GMBH & CO. KG, Putzbrunn (DE)

(72) Inventor: Ulrich Hoeflinger, Munich (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 0 days.

(21) Appl. No.: 15/433,319

(22) Filed: Feb. 15, 2017

(65) Prior Publication Data
US 2017/0241561 A1   Aug. 24, 2017

(30) Foreign Application Priority Data
Feb. 24, 2016   (DE) .......................... 10 2016 103 249

(51) Int. Cl.
*F16K 31/06*   (2006.01)
*H01F 7/18*   (2006.01)

(52) U.S. Cl.
CPC ...... *F16K 31/0675* (2013.01); *F16K 31/0655* (2013.01); *F16K 31/0686* (2013.01); *H01F 7/18* (2013.01)

(58) Field of Classification Search
CPC ............. F16K 31/0655; F16K 31/0675; H01F 7/1805–1838
USPC .................................................... 251/129.05
See application file for complete search history.

(56) References Cited

U.S. PATENT DOCUMENTS

| | | | | |
|---|---|---|---|---|
| 4,173,031 A | * | 10/1979 | Leichle | F02D 41/20 361/154 |
| 4,539,967 A | * | 9/1985 | Nakajima | F02D 31/003 123/438 |
| 4,823,825 A | * | 4/1989 | Buchl | F01L 9/04 123/90.11 |
| 5,703,750 A | | 12/1997 | Kim et al. | |
| 6,056,000 A | | 5/2000 | Santacatterina et al. | |
| 6,560,088 B1 | * | 5/2003 | Beck | F01L 9/04 251/129.01 |
| 6,985,345 B2 | | 1/2006 | Hermann et al. | |

(Continued)

FOREIGN PATENT DOCUMENTS

CN   1145464 A   3/1997
CN   1445798 A   10/2003
(Continued)

*Primary Examiner* — Seth W. Mackay-Smith
(74) *Attorney, Agent, or Firm* — McNees Wallace & Nurick LLC

(57) ABSTRACT

A method for controlling the through-flow cross-section of a gas valve is described. The gas valve comprises a valve body in which a flow channel is provided, a valve element which can be displaced therein between a closed position and an opened position, an armature, a coil, a spring and a control circuit. For opening the flow channel, the control circuit excites the coil with a pulse width-modulated current, the pulse duty factor of which, starting from a starting value, is increased until the armature starts moving out of the closed position against the effect of the spring. Then, the control circuit reduces the pulse duty factor before the valve element has reached the opened position. The control circuit then sets the pulse duty factor at a predefined holding value with which the valve element is held in the opened position.

5 Claims, 1 Drawing Sheet

(56) References Cited

U.S. PATENT DOCUMENTS

| | | | | |
|---|---|---|---|---|
| 7,740,225 | B1* | 6/2010 | Estelle | F16K 31/0665 251/129.05 |
| 2002/0050579 | A1* | 5/2002 | Near | F16K 31/0675 251/129.05 |
| 2003/0052535 | A1* | 3/2003 | Woerner | B60T 8/36 303/119.2 |
| 2004/0251440 | A1* | 12/2004 | Gnadinger | F16K 7/045 251/129.05 |
| 2005/0145282 | A1* | 7/2005 | Chian | F16K 31/0675 137/613 |
| 2006/0006354 | A1* | 1/2006 | Guler | E03C 1/057 251/129.04 |
| 2009/0026397 | A1* | 1/2009 | Evers | F16K 31/06 251/129.04 |
| 2009/0213520 | A1* | 8/2009 | Bedingfield | H01F 7/1805 361/154 |
| 2010/0308243 | A1* | 12/2010 | Bedingfield | F16K 7/045 251/129.15 |
| 2011/0214741 | A1* | 9/2011 | Fukano | H01F 7/1805 137/1 |
| 2015/0267800 | A1* | 9/2015 | Phillips | F16H 57/0412 251/129.22 |
| 2017/0107953 | A1* | 4/2017 | Weldon | F02M 26/67 |
| 2017/0284556 | A1* | 10/2017 | Omekanda | F16K 31/0675 |

FOREIGN PATENT DOCUMENTS

| | | |
|---|---|---|
| CN | 200968438 Y | 10/2007 |
| DE | 10216484 A1 | 4/2002 |
| DE | 10216484 A1 | 10/2003 |
| EP | 1130300 A1 | 9/2001 |
| EP | 2642495 A2 | 9/2013 |

* cited by examiner

GAS VALVE AND METHOD FOR ACTUATION THEREOF

The invention relates to a method for controlling the through-flow cross-section of a gas valve and to a gas valve.

BACKGROUND OF THE INVENTION

For mobile gas heaters, as used e.g. in camper vans or leisure craft, gas valves are used with which the gas flow to a gas burner of the gas heater is controlled. In simplified terms, the gas valve consists of a valve body in which a through-flow cross-section and a valve seat are provided. A valve element is provided which, starting from a closed position in which it lies against the valve seat and closes the through-flow cross-section, can be moved into an opened position in which the through-flow cross-section is cleared.

The valve element is connected to an armature to which a coil is associated. When the coil is excited, i.e. is supplied with current, it displaces the armature so that the valve element is moved into the opened position. Furthermore, a spring is provided which acts upon the armature or the valve element in such a way that the valve element is in the closed position when the coil is unpowered.

It is known from the prior art that two windings are allocated to the armature, namely a pulling winding and a holding winding.

The pulling winding serves to exert a large force on the armature and to displace it against the effect of the spring in such a way that the valve element moves into the opened position. A relatively high level of electric current is required for this purpose.

The holding winding serves to hold the armature in the opened position after it has been displaced by the pulling winding into this position. The force required to hold the armature in the opened position is smaller than the force which must be provided by means of the pulling winding. Consequently, the holding winding must also be supplied only with a comparatively low level of current which is in the order of 20% of the current of the pulling winding. The holding winding alone is not able to move the armature into the opened position.

When the gas valve is to be opened, a short current pulse is applied to the pulling winding in order to pull the armature into the opened position. Then, the holding winding is excited with a constant current in order to hold the armature in the opened position over a prolonged period.

A disadvantage of this is that, owing to the current pulse with which the pulling winding is excited in order to open the gas valve, the armature and also the valve element are displaced into the opened position at a high speed. In so doing, they strike against a stop, whereby noise and mechanical vibrations are produced throughout the system.

DE 102 16 484 A1 also discloses exciting a solenoid of an electromagnetic valve with a pulse width-modulated current. The pulse duty factor is reduced at a predetermined time so that the speed of displacement of the armature is reduced. Nevertheless, it is not possible to reliably prevent the armature from coming into contact with the stop at an undesirably high speed.

The object of the invention is to reduce the noise produced during opening of the gas valve.

BRIEF DESCRIPTION OF THE INVENTION

In order to achieve this object, in accordance with the invention a method is provided for controlling the through-flow cross-section of a gas valve, which comprises a valve body in which a flow channel is provided, a valve element which can be displaced therein between a closed position and an opened position, an armature, a coil, a spring and a control circuit, wherein the following steps are provided in order to open the through-flow cross-section:

the control circuit excites the coil with a pulse width-modulated current, the pulse duty factor of which, starting from a starting value, is increased until the armature starts moving out of the closed position against the effect of the spring;

the control circuit reduces the pulse duty factor before the valve element has reached the opened position;

the control circuit sets the pulse duty factor at a predefined holding value with which the valve element is held in the opened position.

The invention is based on the fundamental idea of using only a single coil to displace the valve element, wherein the coil is supplied with a variable current. At the beginning of the opening process, a higher level of current is provided, which is reduced as soon as the valve element has started to move. In order to hold the valve element in the opened position, a constant holding current is used. The actually effective current is set by pulse width modulation of the voltage applied to the coil. A pulse width modulation can be achieved electronically with comparatively little outlay and with a high degree of effectiveness.

Provision is preferably made for a current sensor to evaluate the current flowing through the coil in order to detect a movement of the armature. This makes it possible to implement a closed loop control with which the opening current can be reduced as befits the situation. Furthermore, with little outlay and without external position sensors, it is possible to monitor when the armature begins to move.

Provision is preferably made for the control circuit to reduce the pulse duty factor gradually as soon as the armature starts moving towards the opened position. In this way, the armature is prevented from being accelerated to a comparatively high speed before it has reached its opened position. As soon as the valve element and the armature, specifically, have overcome the static friction and started to move, a force which is smaller than the force required to start any movement of the valve element and the armature will suffice to maintain the movement of the armature into the opened position.

According to one embodiment of the invention, provision is made for the control circuit to keep the pulse duty factor constant, once it has been reduced, until it is finally set at the holding value. This embodiment is characterized by a comparatively simple algorithm for setting the pulse duty factor.

According to an alternative embodiment, provision is made for the control circuit to vary the pulse duty factor, once it has been reduced, until it is finally set at the holding value. Provision can be made for the control circuit to reduce the pulse duty factor, whereby, towards the end of the opening procedure, the opening force acting on the armature is also reduced. In this way, it is ensured that the armature and the valve element reach the fully opened state at comparatively low speed. Provision can also alternatively be made for the pulse duty factor to be increased during the opening procedure. In this way, the force of the spring increasing during opening can be compensated for so that the armature and the valve element are displaced into the completely opened position at the desired speed.

In order to close the through-flow cross-section, the holding current is shut off. The spring then ensures that the valve element is displaced back into the closed position.

The holding current can be switched off suddenly when the valve is to be closed. It is also possible for the holding current to be reduced first, before it is then fully shut off. This can be advantageous with respect to the development of noise.

In order to achieve the above-mentioned object, a gas valve is also provided having a valve element, a valve seat with which the valve element can cooperate in order to close or clear the through-flow cross-section, a spring which urges the valve element into a closed position, an armature which is connected to the valve element, a coil with which the armature can be displaced into an opened position against the effect of the spring, a control circuit which can provide a pulse width-modulated signal to excite the coil, and a current sensor with which the current flowing through the coil can be monitored in such a way that the method according to any one of the preceding claims can be carried out. With respect to the resulting advantages, reference is made to the explanatory statements given above.

BRIEF DESCRIPTION OF THE DRAWINGS

The invention will be described hereinafter with the aid of an embodiment which is illustrated in the attached drawings. In the drawings.

DETAILED DESCRIPTION OF THE INVENTION

Figure 1:
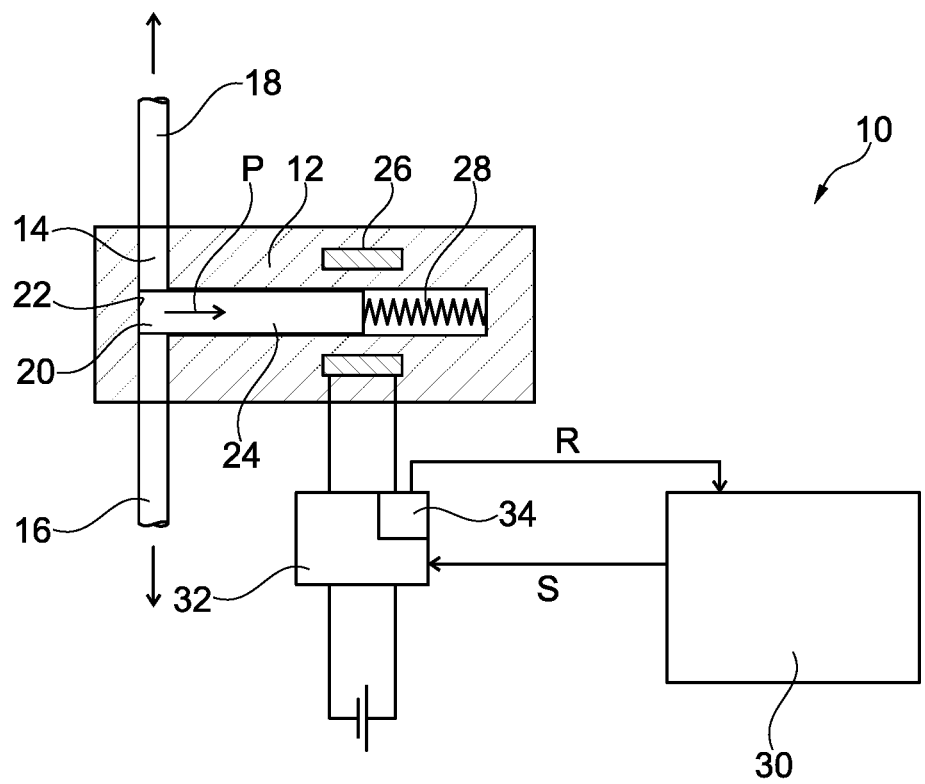
FIG. 1 schematically shows a gas valve in accordance with the invention.

FIG. 1 shows a gas valve 10 which has a valve body 12 in which a flow channel 14 for combustion gas is provided. A combustion gas can flow through the flow channel 14 when it is open, said gas being provided via a supply line 16 from e.g. a compressed gas cylinder and being fed via a connection line 18 to a gas burner.

A valve element 20 is displaceably disposed in the valve body 12 and can cooperate with a valve seat 22 (schematically illustrated herein as a wall of the flow channel 14) in such a way that, when the valve element 20 is in the closed position, the through-flow cross-section is closed by the flow channel 14; no gas can flow through the gas valve 10.

An armature 24, which can likewise be displaced in the valve body 12, is connected to the valve element 20 (or is formed as one piece therewith). The armature 24 is allocated a single coil 26.

Furthermore, a spring 28 is provided which urges the armature 24 and the valve element 20 into the closed position shown in FIG. 1.

The gas valve 10 also has a control circuit 30 which provides actuation electronics 32 with a control signal S. The actuation electronics 32 provide the current which flows through the coil 26.

A current sensor 34 is also integrated into the actuation electronics 32, the current sensor being used to monitor the current flowing through the coil 26. The current sensor 34 provides the control circuit 30 with a feedback signal R so that information about the level of the current flowing through the coil 26 is available in the control circuit 30.

The actuation electronics 32 excite the coil 26 with a pulse width-modulated current, i.e. a current which is switched on and off periodically corresponding to a preset ratio. The power regulation is thus effected in that the voltage applied to the coil 26 is switched on and off periodically between 0 and the supply voltage, wherein the effective current flow is produced as the average of the current which flows on average in the phases with the voltage switched off and the phases with the voltage applied. A characteristic variable for such pulse width modulation is the so-called pulse duty factor which specifies the proportion of the phases with the voltage switched on in relation to the total cycle duration. With a pulse duty factor of 0.9, the supply voltage is thus applied for a duration of 90% of a period, while it is switched off for a duration of 10%.

Figure 2:
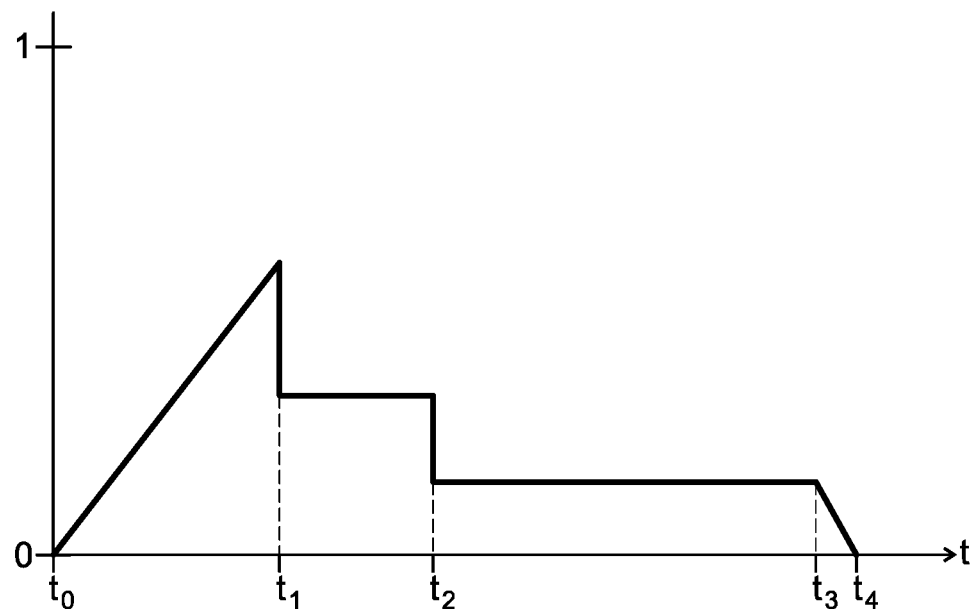
FIG. 2 shows a diagram of the pulse duty factor of the current flowing through the coil of the gas valve shown in FIG. 1 during opening and closing of the gas valve.

The opening and closing of the valve element 20 will be explained hereinunder with the aid of an exemplified embodiment and FIG. 2.

At time $t_0$, the control electronics 30 begin to open the gas valve 10. For this purpose, an increasing level of current is applied to the coil 26, in this case illustrated by an increasing pulse duty factor.

In the exemplified embodiment, the current supply begins with a pulse duty factor of 0. It is also possible for a value above 0 to be selected as the starting value.

The pulse duty factor increases until, at time $t_1$, the valve element 20 and the armature 24 begin to leave the fully closed position (see the arrow P in FIG. 1). This is detected by the current sensor 34 since the armature 24 moving relative to the coil 26 changes the inductance of the coil so that the current flowing through the coil also changes.

The pulse duty factor required to open the valve element 20 can be different. For example, when the gas valve 10 has not been activated for a prolonged period of time, a greater force may be required to open the valve element 20, which may be slightly stuck, than when the valve element 20 has been regularly opened and closed during ongoing operation.

As soon as it is detected that the valve element 20 and the armature 24 are moving, the pulse duty factor is reduced in order to prevent the armature 24 and the valve element 20 from being accelerated further. With the reduced pulse duty factor, the armature 24 and the valve element 20 are displaced further until, at time $t_2$, the fully opened position is reached.

At time $t_2$, the pulse duty factor is reduced further since, in this state, only a holding current has to be provided, with which the armature 24 and the valve element 20 must be held in the completely opened position against the effect of the spring 28 (see the phase from time $t_2$ to time $t_3$).

When the gas valve 10 is to be closed, the pulse duty factor is reduced to 0 (see the phase from $t_3$ to $t_4$). In the exemplified embodiment shown herein, the pulse duty factor is not suddenly set to 0 but rather reduced to 0 in a continuous manner.

In the illuminated exemplified embodiment, during the opening phase of the valve element 20 (phase of time between $t_1$ and $t_2$) a constant pulse duty factor is used in this case. However, in dependence upon the framework conditions it can also be possible to use a pulse duty factor which decreases still further so that the armature 24 moves into its fully closed position in the gentlest manner possible.

Alternatively, provision can also be made for the pulse duty factor between $t_1$ and $t_2$ to be increased somewhat in order to compensate for the force of the spring 28 which increases as the degree of opening increases.

The invention claimed is:

1. A method for controlling a through-flow cross-section of a gas valve, which comprises a valve body in which a flow channel is provided, a valve element which can be displaced therein between a closed position and an opened position, an armature, a coil, a spring and a control circuit, wherein the following steps are provided in order to open the flow channel:

the control circuit excites the coil with a pulse width-modulated current, the pulse duty factor of which, starting from a starting value, is increased until the armature starts moving out of the closed position against the effect of the spring;

the control circuit reduces the pulse duty factor before the valve element has reached the opened position;

the control circuit sets the pulse duty factor at a predefined holding value with which the valve element is held in the opened position;

the pulse duty factor is increased once it has been reduced during the opening procedure after the armature has started moving out of the closed position until it is finally set at the holding value in order to compensate for the force of the spring increasing during the opening procedure.

2. The method of claim 1 wherein a current sensor evaluates the current flowing through the coil in order to detect a movement of the armature.

3. The method of claim 1 wherein the holding current is shut off in order to close the through-flow cross-section.

4. The method of claim 3 wherein the holding current is reduced first, before it is then fully shut off.

5. A gas valve having a valve element, a valve seat with which the valve element can cooperate in order to close or clear the through-flow cross-section, a spring which urges the valve element into a closed position, an armature which is connected to the valve element, a coil with which the armature can be displaced into an opened position against the effect of the spring, a control circuit which can provide a pulse width-modulated signal to excite the coil, and a current sensor with which the current flowing through the coil can be monitored in such a way that the method according to claim 1 can be carried out.

\* \* \* \* \*